(12) United States Patent
Lim (10) Patent No.: US 10,778,088 B2
(45) Date of Patent: Sep. 15, 2020

(54) ENHANCED POWER FACTOR CORRECTION

(71) Applicant: Infineon Technologies Austria AG, Villach (AT)

(72) Inventor: Shu Fan Lim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/240,628

(22) Filed: Jan. 4, 2019

(65) Prior Publication Data
US 2020/0220452 A1 Jul. 9, 2020

(51) Int. Cl.
*H02M 1/42* (2007.01)
*H02M 1/12* (2006.01)

(52) U.S. Cl.
CPC ......... *H02M 1/4208* (2013.01); *H02M 1/126* (2013.01)

(58) Field of Classification Search
CPC .... H02M 1/42; H02M 1/4208; H02M 1/4258; H02M 3/33523; H02M 7/217
See application file for complete search history.

(56) References Cited

U.S. PATENT DOCUMENTS

| | | | |
|---|---|---|---|
| 7,292,013 B1 * | 11/2007 | Chen | G05F 1/70 323/222 |
| 9,455,623 B2 | 9/2016 | Fan et al. | |
| 9,502,981 B2 | 11/2016 | Schaemann et al. | |
| 2013/0021005 A1 * | 1/2013 | Saint-Pierre | H02M 1/425 323/205 |
| 2013/0094255 A1 * | 4/2013 | Yeh | H02M 1/4225 363/44 |
| 2015/0048807 A1 * | 2/2015 | Fan | H02M 1/42 323/208 |
| 2018/0183326 A1 * | 6/2018 | Eum | H02M 1/4258 |
| 2018/0316260 A1 * | 11/2018 | Beinlich | H02M 1/4208 |

OTHER PUBLICATIONS

"Digital combo multi-mode PFC and time-shift LLC resonant controller," STNRG011, STMicroelectronics, Mar. 2018, 33 pp.
"User Manual UM2340," STNRG011 NVM parameters description, STMicroelectronics, Feb. 2018, 54 pp.
Barrero et al., "Universal and Reconfigurable to UPS Active Power Filter for Line Conditioning," Jul. 18, 2002, 8 pp.
Bianco et al., "Enhanced Constant-On-Time Control for DCM/CCM Boundary Boost PFC Pre-regulators: Implementation and Performance Evaluation," Applied Power Electronics Conference and Exposition, Mar. 16-20, 2014, 7 pp.

(Continued)

*Primary Examiner* — Gary L Laxton
(74) *Attorney, Agent, or Firm* — Shumaker & Sieffert, P.A.

(57) ABSTRACT

In some examples, a controller controls a switch of a power factor correction circuit, where the controller includes a first node configured to receive a first signal indicating an input voltage of the power factor correction circuit. The controller also include processing circuitry configured to determine, based on the first signal, a value for an electrical current through one or more capacitors of the PFC circuit. The processing circuitry is further configured to determine an on-time for the switch based on the value for the electrical current and to toggle the switch based on the on-time.

20 Claims, 8 Drawing Sheets

(56) References Cited

OTHER PUBLICATIONS

Chen et al., "Phase Feedforward Control for Single-Phase Boost-Type SMR," IEEE Transactions on Power Electronics, vol. 24, No. 5, May 2009, 5 pp.

Da Silva et al., "A Single-Phase UPS System With Harmonic Suppression and Reactive Power Compensation," Brazilian Power Electronics Conference, Sep. 27-Oct. 1, 2009, 6 pp.

Ghennam et al., "A Hybrid Parallel Active Filter / Off-Line UPS Unit for Computer Loads," Electrical Power Quality and Utilisation, Journal vol. XIV, No. 2, 2008, 8 pp. (Applicant points out, in accordance with MPEP 609.04(a), that the year of publication, 2008, is sufficiently earlier than the effective U.S. filing date, so that the particular month of publication is not in issue.).

Rasmussen, "Impact of Leading Power Factor on Data Center Generator Systems," Revision 1, Schneider Electric, 2018, 19 pp. (Applicant points out, in accordance with MPEP 609.04(a), that the year of publication, 2018, is sufficiently earlier than the effective U.S. filing date, so that the particular month of publication is not in issue.).

Rasmussen, "The Different Types of UPS Systems," Revision 7, Schneider Electric, 2011, 10 pp. (Applicant points out, in accordance with MPEP 609.04(a), that the year of publication, 2011, is sufficiently earlier than the effective U.S. filing date, so that the particular month of publication is not in issue.).

Santos et al., "Transformerless Single-Phase Universal Active Filter with UPS Features and Reduced Number of Electronic Power Switches," IEEE Transactions on Power Electronics, vol. 31, No. 6, Jun. 2016, 10 pp.

Tey et al., "DSP-Controlled Active Filters for System Harmonics Compensation," Proceedings of the International Conference on Power System Technology, Oct. 13-17, 2002, 6 pp.

Louganski et al., "Reactive Power Control Realizations in Single-Phase Active-Front-End Converters," Twenty-Second Annual IEEE Applied Power Electronics Conference and Exposition, Feb. 25-Mar. 1, 2007, 7 pp.

Infineon Technologies, "100 W (19 V/5.26 A) TV adapter demonstrator with IDP2303A," Nov. 30, 2017, 41 pp.

\* cited by examiner

ENHANCED POWER FACTOR CORRECTION

TECHNICAL FIELD

This disclosure relates to power converters, and more particular, to techniques and circuits associated with switched-mode power converters.

BACKGROUND

A device that receives electrical power from a power source, such as an electrical grid, a battery, or an electric generator, can include a power factor correction (PFC) circuit. Devices that are capable of power factor correction can increase the efficiency of the power source by making the load "seen" by the power source appear more resistive, rather than capacitive or inductive, thus reducing the reactive power. The power factor of a load is based on the instantaneous voltage and the instantaneous current. For a power factor of one, the phase lag between the alternating input voltage and the corresponding alternating input current is zero.

A PFC circuit can be coupled to the input of another power converter (e.g., a flyback converter) and to the output of a rectifier. The PFC circuit and the other power converter together may form a switch mode power supply (SNIPS). The PFC circuit may include a flyback converter topology or a boost converter topology. To increase the power factor, a controller may control the switching operation of the PFC circuit such that the input current more closely follows the input voltage to reduce the phase lag between the input voltage and the input current. The controller may use quasi-resonant switching for the PFC circuit, where the switching frequency is not defined by a clock. The switching frequency range may vary depending on the input voltage and the electrical load.

SUMMARY

This disclosure describes a control technique for a power factor correction (PFC) circuit including a switch and one or more capacitors. The control technique can include determining an electrical current through the one or more capacitors. The control technique can also include determining an on-time for the switch and toggling the switch based on the determined on-time.

In some examples, a controller controls a switch of a power factor correction circuit, where the controller includes a first node configured to receive a first signal indicating an input voltage of the power factor correction circuit. The controller also include processing circuitry configured to determine, based on the first signal, a value for an electrical current through one or more capacitors of the PFC circuit. The processing circuitry is further configured to determine an on-time for the switch based on the value for the electrical current and to toggle the switch based on the on-time.

In some examples, a method includes controlling a switch of a power factor correction (PFC) circuit and receiving a first signal indicating an input voltage of the PFC circuit. The method also includes determining, based on the first signal, a value for an electrical current through one or more capacitors of the PFC circuit. The method further includes determining an on-time for the switch based on the value for the electrical current and toggling the switch based on the on-time.

In some examples, a device includes a computer-readable medium having executable instructions stored thereon, configured to be executable by processing circuitry for causing the processing circuitry to receive a first signal indicating an input voltage of a power factor correction (PFC) circuit. The instructions further cause the processing circuitry to determine, based on the first signal, a value for an electrical current through one or more capacitors of the PFC circuit. The instructions also cause the processing circuitry to determine an on-time for a switch of the PFC circuit based on the value for the electrical current and toggle the switch based on the on-time.

The details of one or more examples are set forth in the accompanying drawings and the description below. Other features, objects, and advantages of the disclosure will be apparent from the description and drawings, and from the claims.

DETAILED DESCRIPTION

This disclosure describes techniques for determining an on-time for a switch based on an electrical current through one or more capacitors of a PFC circuit. The one or more capacitors may be arranged at the input of the PFC circuit as an electromagnetic interference (EMI) filter. By determining the on-time for the switch based on the electrical current using the functions and control loops described herein, a controller can achieve better shaping of the input current with respect to the input voltage.

The controller can use a digital differentiator to extract the waveshape of the input capacitive current from the input voltage signal that sampled by the controller. With the current shaping techniques described herein, the controller can more closely match the input current to the input voltage, thereby improving the power factor, particularly at light load.

The techniques of this disclosure can be used to mitigate issues that arise in critical conductive mode (CrCM), also known as boundary mode. These issues can include higher switching losses caused by higher switching frequencies when operating in CrCM at light loads. A controller can use the control scheme described herein to limit the switching frequency within a range, which may be a frequency law. The controller can choose a higher quasi-resonant (QR)

number to increase the switching period, thereby decreasing the switching frequency. By operating in QR mode at a QR number higher than one (e.g., QR2, QR3, etc.), the controller can reduce the switching losses and increase the power factor, especially for light load conditions.

Figure 1:
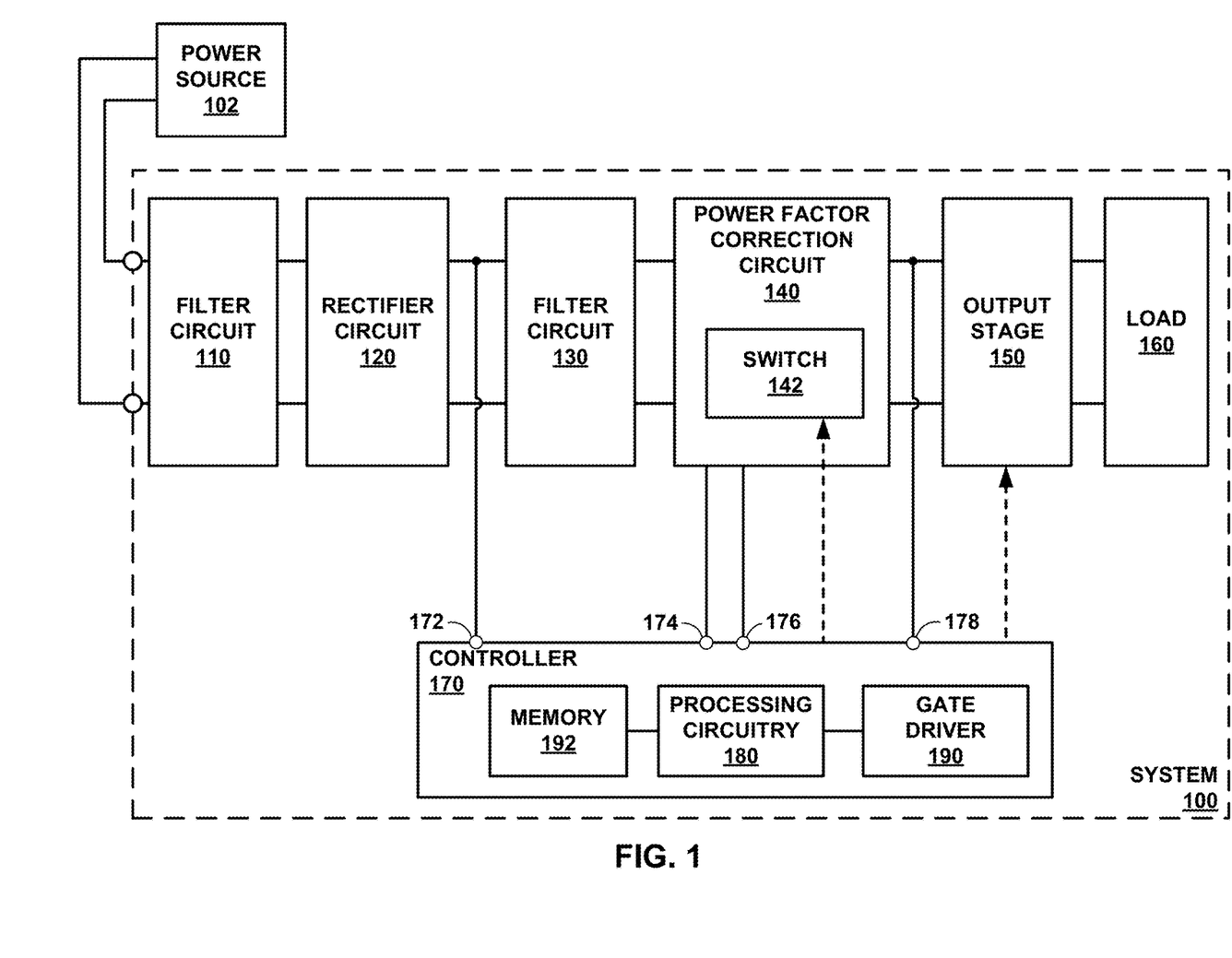
FIG. 1 is a conceptual block diagram of a system including a power factor correction (PFC) circuit, in accordance with one or more aspects of the present disclosure.

FIG. 1 is a conceptual block diagram of a system 100 including a power factor correction (PFC) circuit 140, in accordance with one or more aspects of the present disclosure. System 100 includes filter circuit 110, rectifier circuit 120, filter circuit 130, PFC circuit 140, output stage 150, load 160, and controller 170. System 100 may be configured to receive electrical power from power source 102 at an input node coupled to filter circuit 110. Power source 102 may include an electrical grid (e.g., mains power) that supplies the electrical power to system 100.

Filter circuits 110 and 130 may be configured to filter high-frequency noise out of the electricity received by system 100. Filter circuits 110 and 130 can include one or more capacitors and one or more inductors. Filter circuits 110 and 130 may operate to reduce the noise generated by rectifier circuit 120 and PFC circuit 140 from flowing back out to the power source coupled to the filter circuit. Filter circuits 110 and 130 may be referred to herein as part of PFC circuit 140, such that the one or more capacitors of filter circuits 110 and 130 are referred to as part of PFC circuit 140.

Rectifier circuit 120 may be configured to convert an alternating-current (AC) signal to a half-wave signal. For example, system 100 can receive an AC signal with a sinusoidal waveform and output a half-wave sinusoidal AC signal. Rectifier circuit 120 can include four rectifier diodes. The rectified signal generated by rectifier circuit 120 may include an instantaneous component, labeled $v_g$, and a DC component, labeled $v_{FF}$. Controller 170 can receive a signal indicating the instantaneous component of the rectified signal and extract the DC component from the received signal. For example, controller 170 can run the received signal through a two-stage low-pass filter to extract the DC component of the rectified signal. Additionally or alternatively, controller 170 can perform a Fourier transform to extract the DC component from the received signal.

PFC circuit 140 is configured to receive a signal from filter circuit 130. PFC circuit 140 can operate to more closely match the current of the received signal to the voltage of received signal. PFC circuit 140 may be designed to have a power factor that is as close to unity as possible, where the power factor is calculated as the active power divided by the total power drawn by rectifier circuit 120. An example power factor goal may be 85 percent, 90 percent, or 95 percent for a light load, where a light load can be defined as twenty percent of the power for the rated load. If the rated load is 240 watts, then a light load of twenty percent would be 48 watts. As described herein, controller 170 can control switch 142 to cause the input current to closely match the input voltage, where "closely match" means that PFC circuit 140 has a power factor of at least 85 percent, at least 90 percent, or at least 95 percent at a load that is twenty percent of the rated load.

PFC circuit 140 includes switch 142 that is controlled by controller 170. PFC circuit 140 can also include an inductor, a diode, and an output capacitor. Additional example details of the operation of PFC circuits may be found in commonly assigned U.S. Pat. No. 9,455,623, which issued on Sep. 27, 2016, and is entitled "Power Factor Correction Circuit and Method," and in commonly assigned U.S. Pat. No. 9,502, 981, which issued on Nov. 22, 2016, and is entitled "Enhanced Power Factor Correction," which are incorporated herein by reference in their entirety. In some examples, PFC circuit 140 may have a similar arrangement to the PFC circuits shown in the U.S. Patents referenced above.

Switch 142 may be a power switch such as, but not limited to, any type of field-effect transistor (FET) such as a metal-oxide-semiconductor FET (MOSFET), a bipolar junction transistor (BJT), an insulated-gate bipolar transistor (IGBT), a high-electron-mobility transistor (HEMT), a gallium-nitride (GaN) based transistor, or another element that uses voltage for its control. Switch 142 may include various material compounds, such as silicon (Si), silicon carbide (SiC), Gallium Nitride (GaN), or any other combination of one or more semiconductor materials. Switch 142 may include an n-type transistor or a p-type transistor and may be a power transistor. In some examples, switch 142 can also include other analog devices such as diodes and/or thyristors. Switch 142 may also include a freewheeling diode connected in parallel with a transistor to prevent reverse breakdown of the transistor.

Switch 142 may include three terminals: two load terminals and a control terminal. For a MOSFET switch, switch 142 may include a drain terminal, a source terminal, and a gate terminal. For a BJT switch, the control terminal of switch 142 may be a base terminal. Current may flow through a load current path that extends between the load terminals of switch 142, based on the voltage at the control terminal. Therefore, electrical current may flow through switch 142 based on a signal delivered by gate driver 190 to switch 142.

Output stage 150 can include a DC/DC converter, such as a flyback converter, a resonant-mode converter, a forward converter, a half-bridge converter, and/or another type of converter that receives the output of PFC circuit 140. Output stage 150 may be configured to generate an output signal for load 160. In some examples, output stage 150 converts a high output voltage received from PFC circuit 140 (e.g., 385 volts or 400 volts) to a lower voltage level such as twelve volts or five volts.

Load 160 can include a resistive load, a capacitive load, and/or an inductive load. Examples of inductive loads may include actuators, motors, and pumps used in one or more of heating, air condition, water supply, a fan, or other systems that include inductive loads. In some examples, load 160 includes a capacitive load that can receive electrical power from output stage 150 through, for example, an inverter circuit. Examples of capacitive loads may include lighting elements, such as a Xenon arc lamp. In yet other examples, load 160 may be a combination of resistive, inductive, and capacitive loads.

Controller 170 is configured to control the operation of switch 142. In some examples, controller 170 may be a combination controller that is configured to also control the operation of one or more switches of output stage 150. Controller 170 can include nodes 172, 174, 176, and 178 for receiving signals from system 100. Controller 170 may also include processing circuitry 180, gate driver 190, and memory 192. In higher-power applications, controller 170 may be configured to deliver a control signal to a gate driver that is external to controller 170.

Node 172 of controller 170 may be configured to receive a first signal indicating an input voltage of PFC circuit 140. Rectifier circuit 120 can generate the input voltage of PFC circuit 140. Nodes 174, 176, and 178 of controller 170 can receive signals indicating the current through switch 142, a voltage drop across a load current path of switch 142, and/or a voltage level of the output signal generated by PFC circuit 140. Processing circuitry 180 may be configured to detect one or more local minimum portions of a received signal. Processing circuitry 180 can detect a local minimum portion by detecting a zero-crossing of the received signal or by detecting that the received signal has crossed another threshold level. Processing circuitry 180 may be configured to determine the on-time at least in part by selecting one of the detected local minimum portions based on the received signal. Processing circuitry 180 can turn on switch 142 during the selected local minimum portion.

Processing circuitry 180 is configured to determine a value for an electrical current through one or more capacitors of PFC circuit 140 based on the first signal received by node 172. The one or more capacitors of PFC circuit 140 can be a part of filter circuit 110 and/or 130, but are referred to as part of PFC circuit 140. Processing circuitry 180 can use Equation (1) to determine the electrical current $i_{ctot}(t)$ based on the total capacitance Got of the one or more capacitors and the input voltage $v_g(t)$ of PFC circuit 140. The input current to filter circuit 110 may be equal to the inductor current plus the capacitive current. The capacitive current $i_{ctot}(t)$ may be equal to the sum of all of the currents through the input EMI capacitors. Differentiating the input voltage will give a value that is proportional to the capacitive current, as shown in Equation (1).

$$i_{ctot}(t) = C_{tot}\frac{dv_g(t)}{dt} = K_S\frac{dV_g(t)}{dt} = \left(\frac{C_{tot}}{K_d K_{vg} K_{ADC}}\right)\frac{dV_g(t)}{dt} \quad (1)$$

Processing circuitry 180 is also configured to determine an on-time for switch 142 based on a value for the electrical current through the one or more capacitors. Processing circuitry 180 can use Equation (2) to determine the desired on-time for switch 142 based on the inductance L of an inductor in PFC circuit 140, the DC equivalent ver of the input voltage, the output $v_{control}$ of the voltage controller, and a constant of proportionality $K_1$ to balance the gain difference between the reference inductor current and the sampled average inductor current. Thus, processing circuitry 180 can determine the desired on-time based on the electrical current ($C_{tot}$ times the derivative of $v_g$) and the first signal ($v_g$).

$$t_{onDesired} = \frac{2LK_1 v_{control}}{v_{FF2}} - \frac{2L}{v_g}C_{tot}\frac{dv_g}{dt} = \frac{K_2 v_{control}}{v_{FF2}} - \frac{2L}{v_g}C_{tot}\frac{dv_g}{dt} \quad (2)$$

Figure 5:
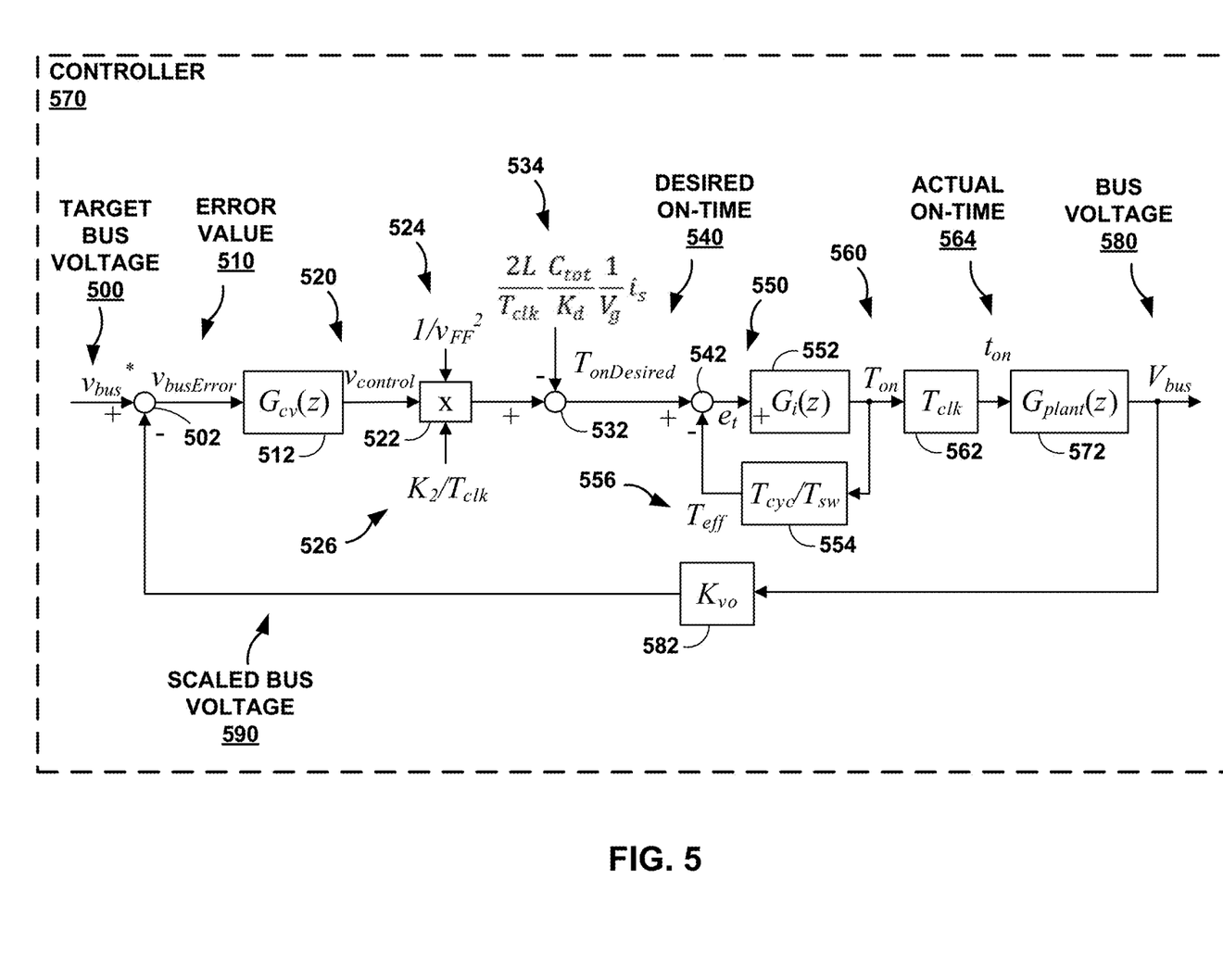
FIG. 5 is a conceptual block diagram of a control loop for determining an on time for a switch in a PFC circuit, in accordance with one or more aspects of the present disclosure.

Processing circuitry 180 can determine an actual on-time $t_{on}$ for switch 142 based on the desired on-time, the off-time $t_{off}$ and the switching period $t_{sw}$ using Equation (3). The sum of the on-time and off-time can be different than the switching period for QR modes that are greater than QR1. Processing circuitry 180 can use an inner control loop, which can be an integrator or a proportional-integral control, as shown in FIG. 5 (e.g., blocks 542, 552, and 554), to determine the actual on-time based on the desired on-time.

$$t_{on}\frac{t_{on} + t_{off}}{t_{sw}} = t_{onDesired} \quad (3)$$

Processing circuitry 180 may be configured to toggle switch 142 based on the value for the actual on-time. For example, processing circuitry 180 can choose the QR mode (e.g., QR1, QR2, or QR3) based on the measured switching frequency. Processing circuitry 180 can cause gate driver 190 to turn on switch 142 during a local minimum portion that corresponds to the value for the on-time.

Processing circuitry 180 may be configured to control the parameters or characteristics of the signals generated by gate driver 190. In some examples, processing circuitry 180 may be configured to generate a lower-power control signal, and gate driver 190 may be configured to convert the lower-power control signal into a driver signal with higher power. Processing circuitry 180 and gate driver 190 may be combined into a single integrated circuit or a single controller (e.g., controller 170). Alternatively, processing circuitry 180 and gate driver 190 may be built on separate circuits, chips, or devices.

Memory 192 may be configured to store any of the values or signals described herein, such as on-times, off-times, switching frequencies, electrical currents, capacitances, target values, error values, and/or any other parameters or values. In some examples, memory 192 can store program instructions, which may include one or more program modules, which are executable by processing circuitry 180. When executed by processing circuitry 180, such program instructions may cause processing circuitry 180 to provide the functionality ascribed to it herein.

Figure 2A:
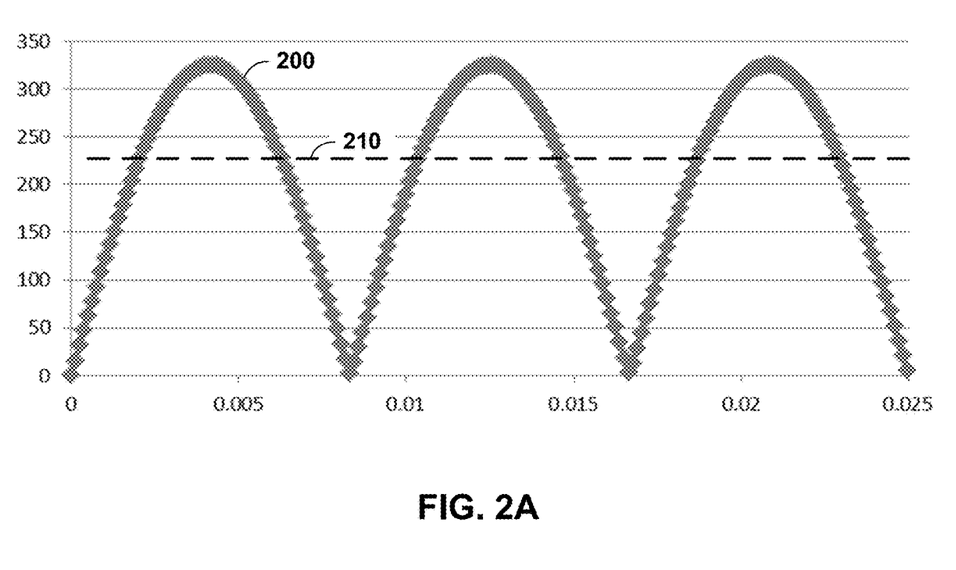
FIGS. 2A and 2B are example graphs of an input voltage and an electrical current through one or more capacitors.
Figure 2B:
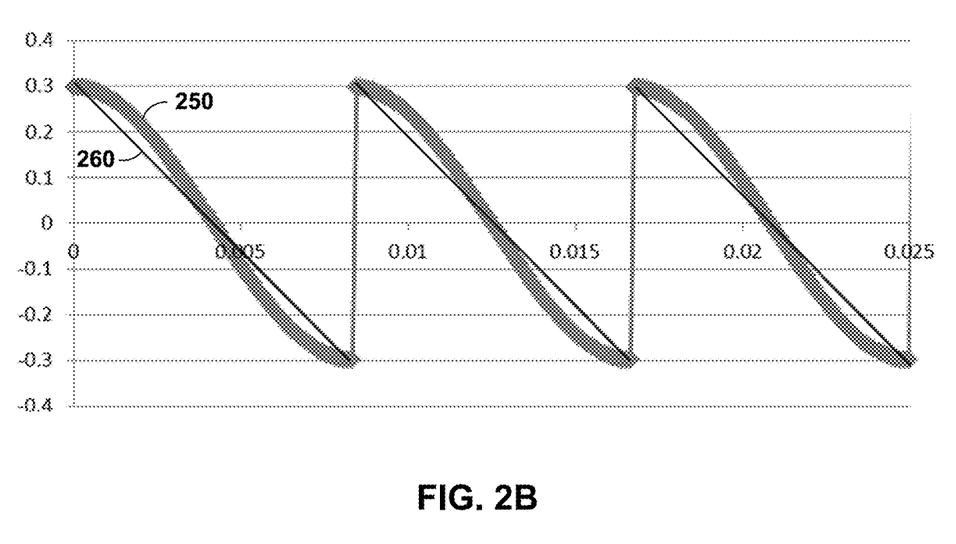

FIGS. 2A and 2B are example graphs of an input voltage 200 and an electrical current 250 through one or more capacitors. In the example of FIG. 2A, input voltage 200 is a rectified half sinusoidal waveform. Input voltage 200 may be the output signal generated by a rectifier circuit and/or the input signal received by a PFC circuit. Input voltage 200 may be represented by the variable $v_g$ in Equations (1) and (2) above, and DC value 210 may be represented by the variable $v_{FF}$ in Equation (2) above.

The controller can receive a signal indicating input voltage 200 through, for example, a divider circuit that scales input voltage 200 from tens or hundreds of volts down to a range of two, three, four, or five volts. The controller may include an analog-to-digital converter (ADC) that converts the received signal to a digital value. The controller may apply a low-pass filter, such as a two-stage low-pass filter, to the received signal to determine DC value 210. The low-pass filter can remove or reduce the harmonic components of input voltage 200.

In the example of FIG. 2B, electrical current 250 is a portion of a sinusoidal waveform with an amplitude change every half period. Electrical current 250 may be sum of the electrical currents through one or more capacitors in a filter circuit of a PFC circuit. Electrical current 250 may be represented by the variable $i_{ctot}(t)$ in Equation (1) above. Linear approximation 260 is a straight line for each half period that approximates the amplitude of electrical current 250.

The period of the waveforms shown in FIGS. 2A and 2B may be twice the frequency of the AC power supply. The AC power supply provided by the electrical mains can have a frequency of fifty hertz or sixty hertz. In contrast, the switching frequency for a switch in a PFC circuit may be in the range of one kilohertz to one megahertz. The switching frequency typically operates above twenty kilohertz—otherwise, the EMI filter will be very large to filter low frequencies. To increase the power factor, especially at light load, a controller may estimate electrical current 250 in order to compensate for electrical current 250.

In some examples, the controller can estimate electrical current 250 using linear approximation 260. For example, the controller starts a counter or a timer when a sensed signal received by the controller crosses a threshold value. The controller may include a comparator to compare electrical current 250 to the threshold value. The threshold value can be adjusted by a base parameter and a gain parameter. The base parameter corresponds to a base value of the comparator threshold. The gain parameter sets the slope of the ramp of linear approximation 260, and the controller can apply to the comparator threshold for capacitive current compensation. Linear approximation 260 is a simple implementation of the sinusoidal waveform of electrical current 250. However, linear approximation 260 does not fully compensate for electrical current 250 and can introduce current distortion.

Figure 3:
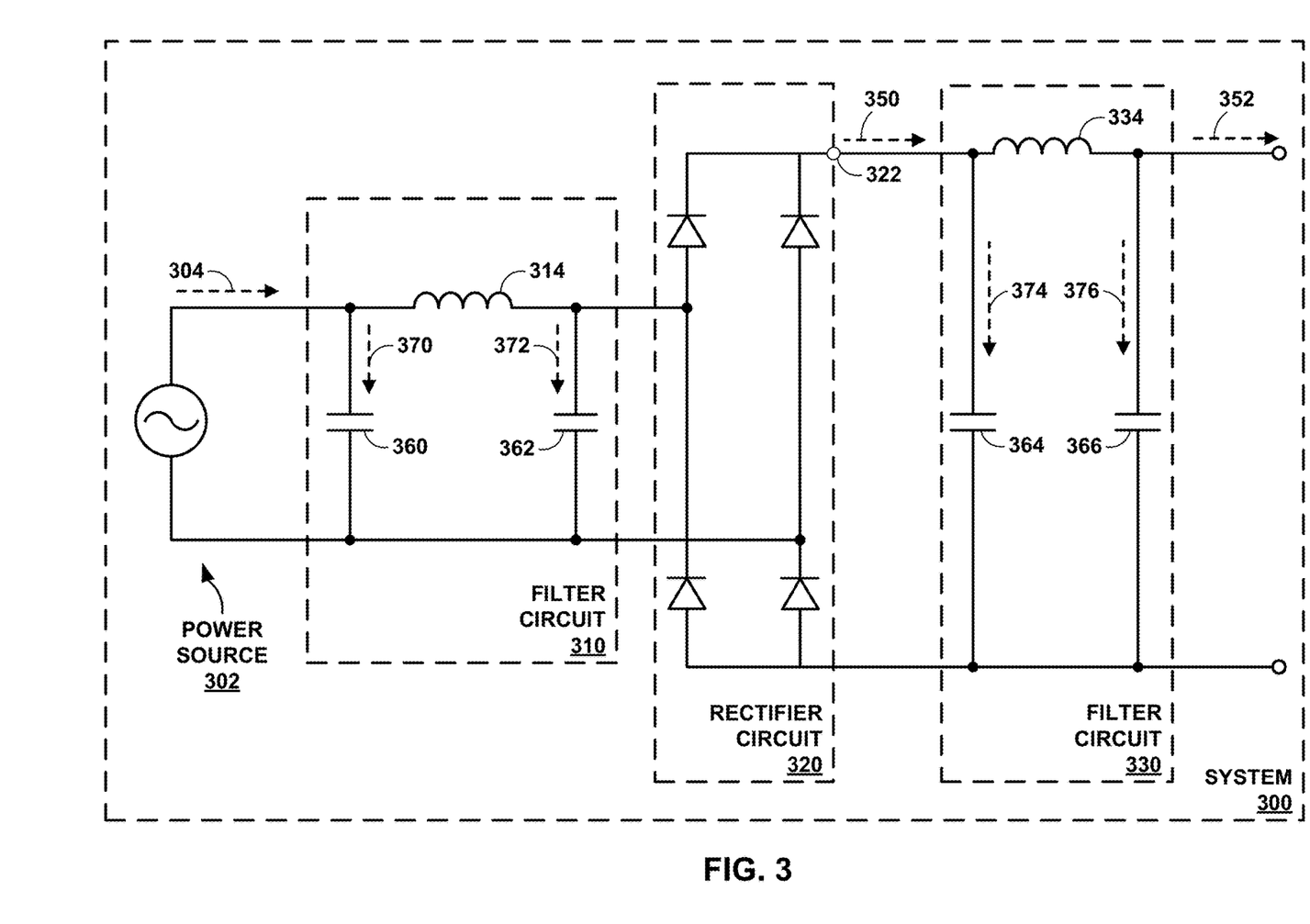
FIG. 3 is a circuit diagram of a system including a rectifier circuit and filter circuitry, in accordance with one or more aspects of the present disclosure.

FIG. 3 is a circuit diagram of a system including a rectifier circuit 320 and filter circuitry 310 and 330, in accordance with one or more aspects of the present disclosure. Filter circuits 310 and 330 and rectified circuit 320 are shown as passive circuits but can include active components in some examples. For example, the diodes of rectifier circuit 320 can include parallel switches to reduce the voltage drop when the diodes are conducting. In operation, filter circuit 310 receives electrical power from power source 302. Rectifier circuit 320 can generate a rectified signal based on the first filtered signal from filter circuit 310. Filter circuit 330 can filter the rectified signal and delivered a second filtered signal to a PFC circuit, which is not shown in FIG. 3.

Filter circuits 310 and 330 include capacitors 360, 362, 364, and 366. In some examples, filter circuits 310 and 330 include more or fewer than four capacitors. Filter circuits 310 and 330 can be arranged in different configurations or combinations, and capacitors 360, 362, 364, and 366 and inductors 314 and 334 can be arranged in a different position. Filter circuits 310 and 330 may function to reduce the EMI and other noise that is reflected back to power source 302. Electrical currents 370, 372, 374, and 376 through capacitors 360, 362, 364, and 366 may constitute reactive power flow, rather than real power flow, which may reduce the power factor if the controller does not compensate for electrical currents 370, 372, 374, and 376.

Each of filter circuits 310 and 330 includes passive capacitor-inductor-capacitor (C-L-C) configurations before and after the diode bridge of rectifier circuit 320. The voltage drop across the diode bridge of rectifier circuit 320 may be insignificant compared to the AC input voltage generated by power source 302, which may be 90 VAC to 264 VAC. Thus, the voltage applied across capacitors 360 and 362 before rectifier circuit 320 and the voltage applied across capacitors 364 and 366 after rectifier circuit 320 is approximately the same. Hence, the controller can determine a single capacitance ("an equivalent capacitance") of capacitors 360, 362, 364, and 366 and effectively lump together the capacitances after the diode bridge of rectifier circuit 320.

The controller can also determine a value for the electrical current through capacitors 360, 362, 364, and 366 based on the equivalent capacitance and the voltage across the diode bridge of rectifier circuit 320. In some examples, the controller receives a voltage signal from output node 322, where the voltage signal indicates the input voltage received by a PFC circuit. The electrical current through capacitors 360, 362, 364, and 366 is the sum of electrical currents 370, 372, 374, and 376. The controller can determine an estimate of the sum of electrical currents 370, 372, 374, and 376 by differentiating the voltage level of the rectified signal generated by rectifier circuit 320 and multiplying the equivalent capacitance by the differentiated voltage level, as shown in Equation (1) above.

In the circuit arrangement shown in FIG. 3, input current 304 may be equal to electrical currents 370 and 372 through capacitors 360 and 362 added to output current 350 of rectifier circuit 320, as shown in Equation (4). Equation (4) also shows that input current 304 is equal to output current 352 added to the total current $i_{Ctot}$ through capacitors 360, 362, 364, and 366. Equations (5) and (6) show the calculation of the electrical current through capacitors 360, 362, 364, and 366 and the equivalent capacitance $C_{tot}$ of capacitors 360, 362, 364, and 366, respectively.

$$i_{304}=i_{350}+i_{370}+i_{372}=i_{352}+i_{370}+i_{372}+i_{374}+i_{376}=i_{352}+i_{Ctot} \quad (4)$$

$$i_{Ctot}=i_{370}+i_{372}+i_{374}+i_{376} \quad (5)$$

$$C_{tot}=C_{360}+C_{362}+C_{364}+C_{366} \quad (6)$$

Figure 4:
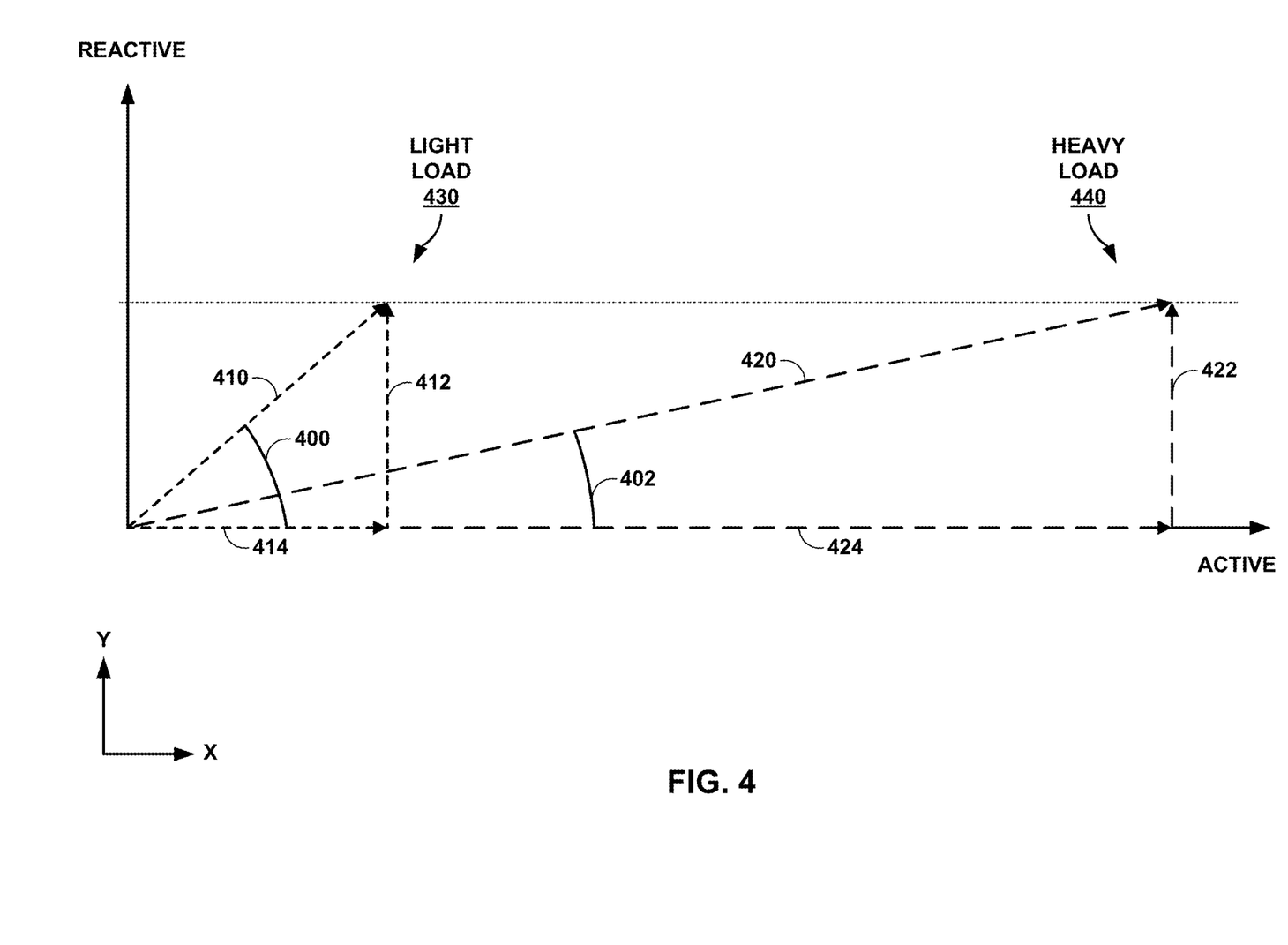
FIG. 4 is a phasor diagram of the inductor current, capacitive current, and input current.

FIG. 4 is a phasor diagram of the inductor current, capacitive current, and input current. The inductor current is also known as the real current or active current and is shown in the x-axis dimension. The capacitive current is also known as the imaginary current or reactive current and is shown in the y-axis dimension. The input current is sum of the real current and the reactive current such that the input current lies between the real axis and the reactive axis. The input current has a phase angle between the input current and real axis (the x-axis). The phase angle is the phase shift in the input current.

The power factor equals the distortion factor multiplied by the displacement factor. The distortion factor equals $I_1\_rms$ divided by $I_{in}\_rms$ where $I_1\_rms$ is the root-mean-square (RMS) current of a fifty or sixty hertz signal. $I_{in}\_rms$ is the RMS value of the input current. The displacement factor is the cosine of the phase angle. The impact of the phase angle on the power factor is important to the control of a PFC circuit. The larger the phase angle, the lower the power factor. The impact on the power factor can be particularly dominant at light load because the capacitive current may remain the same while the real current decreases. Thus, the phase angle and the power factor can increase at light load.

Capacitive current 422 flowing through the one or more capacitors may be significantly smaller than active current 424 flowing into the PFC circuit at conditions of heavy load 440. Vector 420 represents the total current, which is based on currents 422 and 424. Hence, at heavy load 440, the phase shift between the input current and input voltage, which is represented by angle 402, is relatively small. Thus, in the example of FIG. 4, the power factor at heavy load 440 is relatively high because the high amplitude of active current 424.

At light load 430, capacitive current 412 flowing through the one or more capacitors can be more significant with respect to active current 414 flowing into the PFC circuit at conditions of heavy load 440. Vector 410 represents the total current, which is based on currents 412 and 414. Hence, at light load 430, the phase shift between the input current and input voltage, which is represented by angle 400, is relatively large. Thus, in the example of FIG. 4, the power factor at heavy load 440 is higher than the power factor at light load 430.

FIG. 5 is a conceptual block diagram of a control loop for determining an on time for a switch in a PFC circuit, in accordance with one or more aspects of the present disclosure. Controller 570 can implement the control loop in a digital domain, an analog domain, and/or a mixed-digital/analog domain. Controller 570 can implement digital multimode PFC control for QR conduction mode operation.

Each of the blocks and circles shown in FIG. 5 are functional blocks at which controller 570 computes an output value based on the input values.

At voltage controller 512, controller 570 can determine control voltage 520 ($v_{control}$) to be proportional to the output power of the PFC circuit. Voltage controller 512 can be a proportional-integral (PI) controller or a PI-derivative (PID) controller. At multiplier 522, controller 570 can multiply control voltage 520, a value for input voltage feedforward 524 ($v_{FF}$), and constant 526 based on the clock period of controller 570. Input voltage feedforward 524 includes the DC equivalent value ($v_{FF}$) of the sampled rectified AC input voltage ($v_g$). The inductor current reference with input voltage feedforward is Equation (7).

$$i_L^* = \frac{K_1 v_{control} v_g}{v_{FF2}} \quad (7)$$

The average inductor current in a switching cycle is given by Equation (8). In Equation (8), $v_g$ is the rectified AC input voltage, $v_{control}$ is control voltage 520, $K_1$ is a constant of proportionality to balance the gain difference between the reference inductor current and the sampled average inductor current, $v_{FF}$ is the DC equivalent value of the sampled rectified AC input voltage, $t_{on}$ is the turn-on period of the PFC MOSFET, $t_{off}$ is the turn-off period of the PFC MOSFET, $t_{sw}$ is the measured variable switching period, and L is the boost inductance.

$$i_L = \frac{1}{2} i_{Lpk} \frac{t_{on} + t_{off}}{t_{sw}} = \frac{1}{2} \frac{v_g t_{on}}{L} \frac{(t_{on} + t_{off})}{t_{sw}} \quad (8)$$

To achieve good input current shaping, controller 570 can apply Equation (9). Controller 570 can compute desired on-time 540 such that the average inductor current tracks the inductor current reference. Controller 570 may calculate the difference between the output value of multiplier 522 and term 534, which is based on the electrical current flowing through the one or more capacitors.

$$t_{on} \frac{t_{on} + t_{off}}{t_{sw}} = \frac{2LK_1 v_{control}}{v_{FF2}} - \frac{2L}{V_g} C_{tot} \frac{dv_g}{dt} = t_{onDesired} \quad (9)$$

Controller 570 can cause effective on-time 556 to track desired on-time 540 using inner feedback controller 552 and feedback block 554. At adder 542, controller 570 can calculate error value 550 as the difference between effective on-time 556 and desired on-time 540. At block 562, controller 570 can determine actual on-time 564 by multiplying quantized on-time 560 by the clock period. Block 562 may be a mathematical model of the pulse-width modulation (PWM) operation. Controller 570 can send the quantized on-time $T_{on}$ 560 to block 562 to generate the actual on-time 564 ($t_{on}$). The actual on-time 564 may not necessarily be computed by controller 570 because of the PWM hardware unit, which has time in units equal to the inverse of the switching frequency. In some examples, controller 570 can generate actual on-time 564 by multiplying quantized on-time 560 by the clock period. Quantized on-time 560 may be a digital value in terms of the controller clock $T_{clk}$ and voltages are quantized with respect to the reference voltage and resolution of an ADC of controller 570. For example, quantized on-time 560 may have a digital value of one thousand, the clock period may be twenty nanoseconds, and actual on-time 564 may have a value of twenty microseconds. Equation (10) is similar to Equation (9) but includes quantized times, rather than actual times.

$$T_{on} \frac{T_{on} + T_{off}}{T_{sw}} = \frac{2LK_1 v_{control}}{T_{clk} v_{FF2}} - \frac{2L}{v_g} C_{tot} \frac{dv_g}{dt} \quad (10)$$

Controller 570 can use the inner control loop to achieve good input current shaping. Good input current shaping means that controller 570 toggles the switch of the PFC circuit such that the input current drawn by the PFC circuit closely matches the input voltage. The inner control loop includes adder 542, inner feedback controller 552, and feedback block 554. Using the inner control loop, controller 570 can make the effective on-time track the desired on-time. Controller 570 can use an integrator to ensure that the tracking error is zero. Hence, inner feedback controller 552 is usually an integrator or a PI control (the proportional operation makes the control faster than an integrator alone).

Controller 570 can implement the digital differentiator using Equations (11) and (12), where $i_s(t)$ is the electrical current through the one or more capacitors. $V_g$ is a digital representation of the rectified AC input voltage $v_g$, $T_{sv}$ is the execution or sampling rate, and $K_d$ is the differentiator gain. The last term of Equation (12) can compensate for the electrical current through the one or more capacitors. In some examples, the digital differentiator can have a high-frequency pole to filter the switching noise.

$$i_s(t) = \frac{dv_g(t)}{dt} = \frac{K_d}{T_{sv}}(V_g(k) - V_g(k-1)) \quad (11)$$

$$T_{on} \frac{T_{on} + T_{off}}{T_{sw}} = \frac{K_2 v_{control}}{T_{clk} v_{FF2}} - \frac{2L}{T_{clk}} \frac{C_{tot}}{K_d} \frac{1}{V_g} i_s \quad (12)$$

Controller 570 may be configured to determine bus voltage 580 at block 572 based on actual on-time 564. Examples values of bus voltage 580 include 380 volts or 390 volts. Block 572 may be an equivalent plant model representing the QRM boost PFC. Block 572 may not necessarily be part of the implementation of controller 572. The plant model can be used to design controller 570 for a stable closed-loop operation. Controller 570 can feed quantized on-time 560 to a PWM driver to generate actual on-time 564 for driving the MOSFET in the PFC circuit. Controller 570 can switch the PFC circuit on and off according to actual on-time 564 and QR number to regulate bus voltage 580 and ensure good input current shaping. Controller 570 can model this switching behavior as the plant model in block 572.

A PWM driver can send out actual on-time and turn on instance to a gate driver, and the gate driver will turn the switch on and off to regulate the bus voltage 580 and ensure good input current shaping. At block 582, controller 570 may apply a resistor divider ratio to bus voltage 580 to calculate scaled value 590 of bus voltage 580.

At adder 502, controller 570 can calculate error value 510 based on target bus voltage 500 and scaled value 590 of bus voltage 580. Target bus voltage 500 may be a command for the desired bus voltage amplitude, such as 380 volts or 400 volts. Controller 570 can compare scaled value 590 and target value 500 to determine error value 510. For example, controller 570 can subtract scaled value 590 from target value 500 at adder 502. Controller 570 can determine control voltage 520 at least in part by integrating error value 510.

Figure 6:
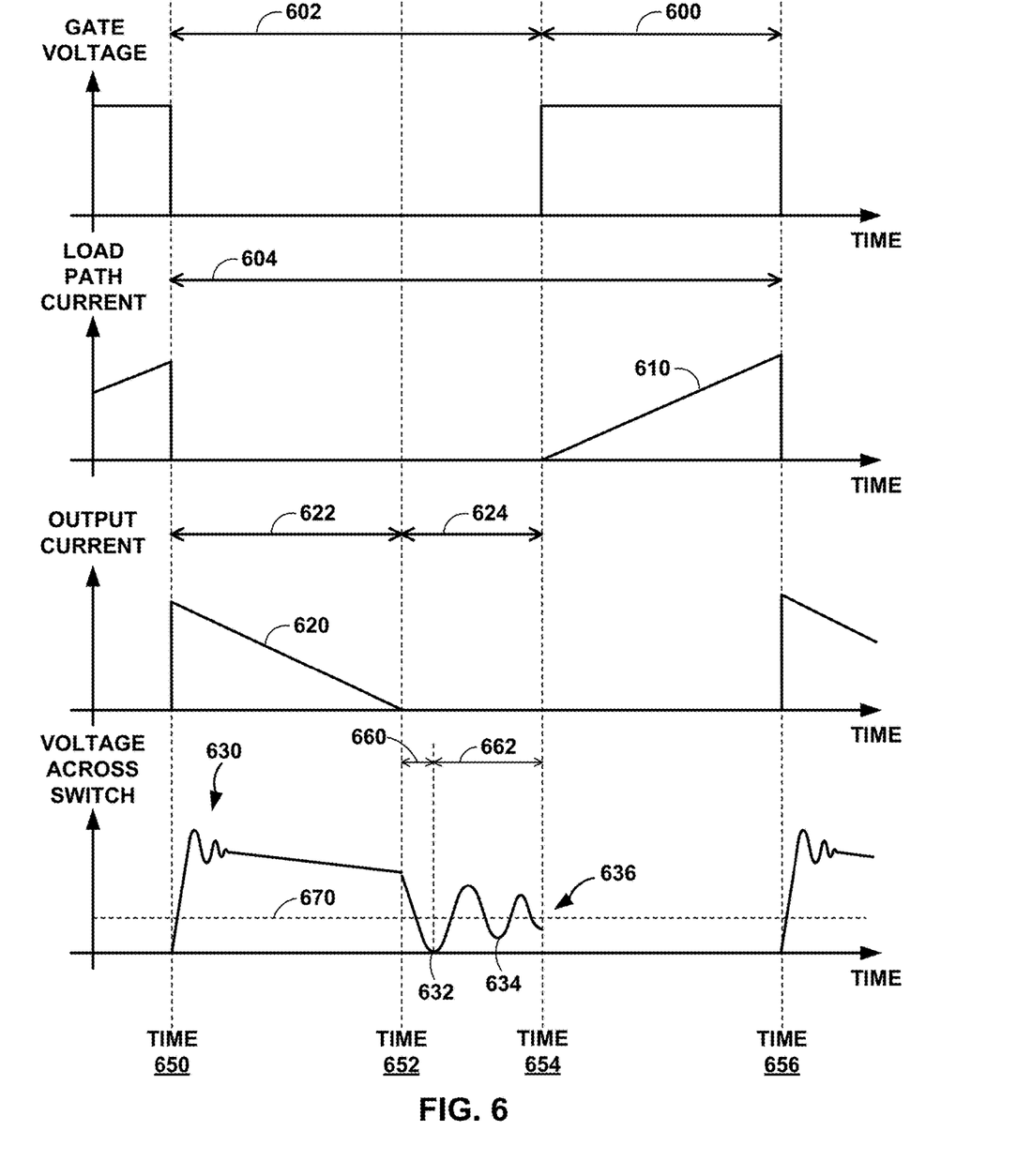
FIGS. 6 and 7 are timing diagrams showing the operation of a PFC circuit, in accordance with one or more aspects of the present disclosure.
Figure 7:
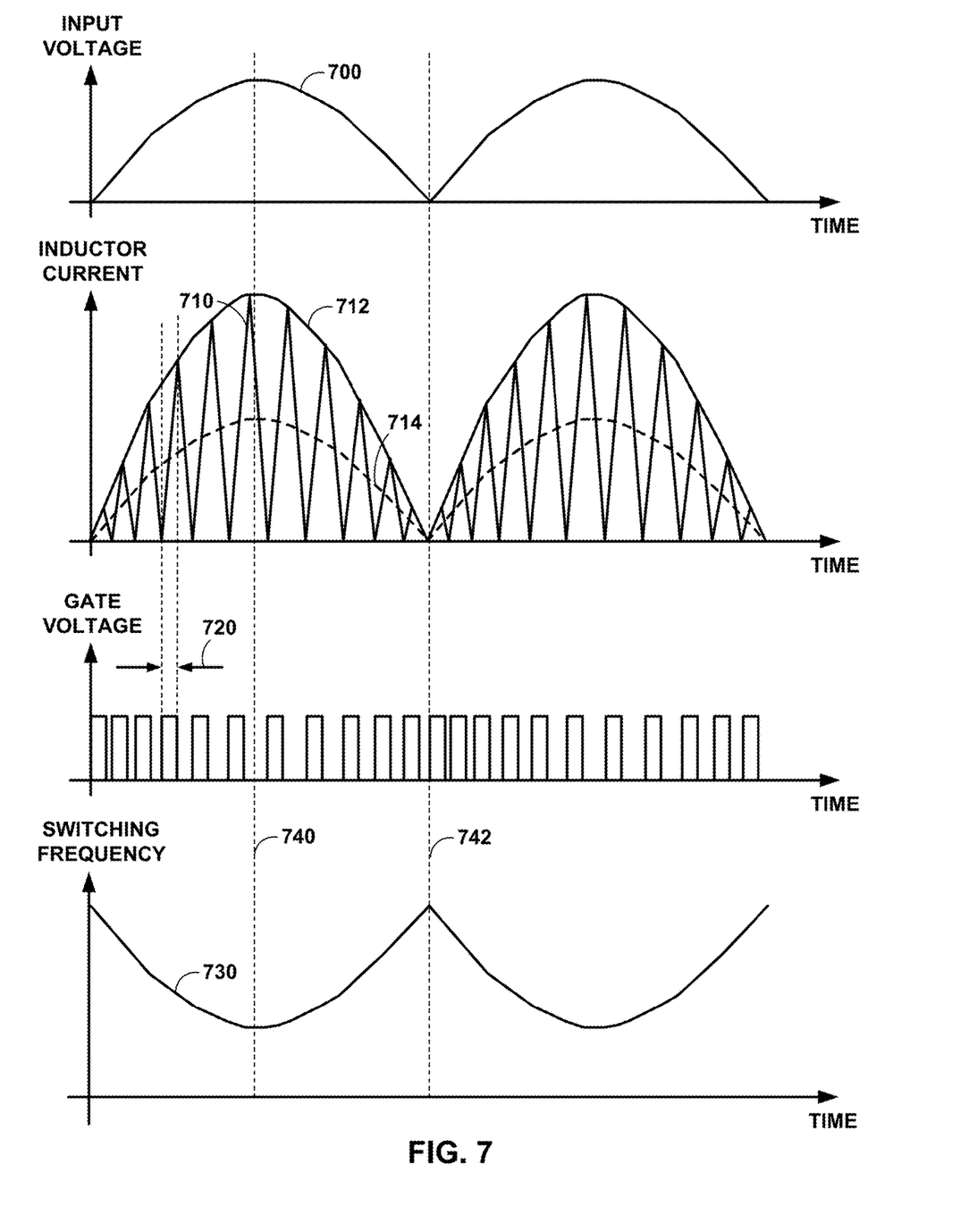

FIGS. 6 and 7 are timing diagrams showing the operation a PFC circuit, in accordance with one or more aspects of the present disclosure. The controller can cause the PFC circuit to operate in discontinuous current mode (DCM), such that the inductor current of the PFC circuit drops to zero and remains zero for at least a short delay time. The output current of the PFC circuit may equal the inductor current of the PFC circuit during time periods in which the switch of the PFC circuit is turned off. DCM is distinguished from continuous current mode (CCM) in which the inductor current does not drop to zero during a switching cycle.

FIG. 6 includes four timing diagrams illustrating (1) the gate voltage for the switch of the PFC circuit, (2) the electrical current through the load current path of the switch, (3) the output current of the PFC circuit, and (4) the voltage across the load current path of the switch. The electrical current that flows through the load current path of the switch may energize the inductor of the PFC circuit. The output current of the PFC circuit may charge the output capacitor of the PFC circuit. The inductor current may be the superposition or sum of the electrical current through the switch and the output current. Thus, the inductor current may have a triangle waveform that increases from zero (e.g., during time period 600) and then decreases to zero (e.g., during time period 622).

The switching period 604, labeled as $T_{sw}$, can be defined as the duration of one switching cycle and is equal to the inverse of the switching frequency. The switching period can be divided into an on-time 600 and an off-time 602. The off-time can be divided into a fall time 622 and a subsequent delay time 624. During fall time 622, the output current decreases from a maximum value to zero. During subsequent delay time 624, the output current remains at or near zero amplitude.

At time 650, a controller can turn off (e.g., toggle) a switch of a PFC circuit by reducing the gate voltage of the switch to zero or nearly zero. The controller can determine when to turn off the switch based on several parameters, such as a rectified voltage received by the PFC circuit, the current through the switch, and the output current of the PFC circuit. At time 650, the voltage across the load current path of the switch quickly rises to a level that depends on the AC half cycle, as shown in Equation (13). The voltage across the load current path rings or oscillates during time period 630 as the voltage level approaches the constant level.

$$i_L = \frac{v_g t_{on}}{L} \qquad (13)$$

Before time 650, the inductor current of the PFC circuit is sunk by the load current path of the switch. After time 650, the inductor current of the PFC circuit is conducted by the diode of the PFC circuit, which is shown in the output current waveform. The voltage across the load current path then slowly decreases until time 652. Between times 650 and 652, the output current of the PFC circuit decreases to zero, and the load path current is equal to zero. When the output current reaches zero at time 652, the voltage across the switch begins oscillating while the output current remains at zero.

The first minimum of the voltage across the switch during time period 624 may be approximately zero volts. The amplitude of the oscillations then gradually decays, experiencing local minimums 632, 634, and 636. Local minimums 632, 634, and 636 may also be referred to as valleys or troughs. The controller can turn on (e.g., toggle) the switch at time 654 by increasing the gate voltage of the switch to start a new on-time period 600. The controller can include a gate driver to generate and deliver a drive signal to the control terminal of the switch. The controller can determine when to turn on the switch by determining a local minimum of the voltage across the switch. In the example of FIG. 6, the controller selects the third local minimum to turn on the switch.

The controller can detect a local minimum in the voltage drop across the load current path of a switch by detecting the crossing of a threshold, such as zero volts or any other threshold level. In some examples, the controller may determine the time period of the oscillations in the voltage across the switch between times 652 and 654, where time period 660 may represent one-half of the time period of the oscillations. In examples in which the controller selects QR3 mode, the controller can determine the crossing of threshold level 670 and start a timer. When the timer reaches one-fourth of the time period of the oscillations, the controller may turn on the switch, which will correspond to the third local minimum 636. By turning on the switch at a local minimum, the controller reduces the switching losses, as compared to turning on the switch when the voltage drop across the switch is higher.

The controller can detect the local minimum using an auxiliary winding in the PFC inductor. The controller may measure an inverted stepped down value of the inductor voltage. When the MOSFET in the PFC circuit turns on, the inductor voltage may be equal to instantaneous rectified input voltage, which is a positive voltage. When the MOSFET turns off, the inductor voltage may be equal to the input voltage minus the output voltage (a negative voltage). As the auxiliary winding provides inverted voltage values, the auxiliary winding has a negative voltage when the MOSFET turns on and a positive voltage when the MOSFET turns off. The controller can clamp the positive voltage to a positive limit, and the controller can clamp the negative voltage to a small negative voltage. When the voltage at this zero crossing detection (ZCD) pin crosses a near-to-zero threshold, the controller may add a wait time of one-fourth of the oscillation period to reach the valley point. The oscillation period may be the resonant oscillation period, and the controller can measure the oscillation period. The controller can use a fixed value for the oscillation period.

The controller can select the N-th local minimum to turn the switch, where N is an integer number equal to or greater than one. A local minimum of the voltage across switch is also referred to as a "quasi-resonant" (QR) switch-on condition. QR switching can reduce the switching losses for the operation of the PFC circuit by increasing the switching period 604. In examples in which the controller sets N equal to one, the DCM is referred to as critical conduction mode (CrCM) or boundary conduction mode (BCM). Thus, BCM or CrCM is a special case of DCM. During QR operation, the controller can regulate on-time 600 and time 656 (e.g., when the controller turns off the switch). In some examples, the controller can determine on-time 600 using a value that varies based on the AC half cycle for QR operation. For CrCM or BCM operation, the on-time may have constant or nearly constant value throughout the AC half cycle.

For QR1 operation, the controller can turn on the switch during local minimum 632. Thus, the off-time for the switch is equal to the sum of time periods 622 and 660. The effective switching time, labeled as $t_{on}+t_{off}$ in the Equations above, may be equal to the sum of time periods 600, 622, and 660. For QR2 operation, the controller can turn on the switch during local minimum 634. For QR3 operation, the controller can turn on the switch during local minimum 636. The controller can detect the first local minimum based on the voltage crossing a threshold level. Thereafter, the controller can count the number of valleys until the selected number is reached. The controller may be configured to set a timer to turn on the switch at approximately the selected local minimum.

FIG. 7 illustrates waveforms for QR1 switching, where the controller turns on a switch during the first local minimum in the voltage drop across the switch. Referring back to the example shown in FIG. 6, local minimum 632 is the first local minimum in the voltage drop across the switch. Using a switching scheme with constant on-time and QR1 can result in good performance of the PFC circuit. Therefore, a power factor close to unity may be achieved with such a switching scheme.

Returning to the example shown in FIG. 7, average inductor current 714 is proportional to and in-phase with input voltage 700. Inductor current 710 ranges from zero to maximum inductor current 712 for each switching cycle. Maximum inductor current 712 ranges from a maximum at time 740 to zero at time 742. FIG. 7 depicts eleven switching cycles for each period of input voltage 700, but there can be any number of switching cycles for each period, such as hundreds or thousands of switching cycles. The rise time for inductor current 710 is equal to pulse duration 720, which is the on-time for the switch of the PFC circuit.

Switching frequency 730 varies within a relatively wide range based on input voltage 700 and the load that is supplied by PFC circuit. For example, switching frequency 730 ranges from a minimum at time 740 to a maximum at time 742. High switching frequencies may be undesirable because of electromagnetic interferences and high switching losses that lead to lower efficiency. It may be desirable to reduce the switching frequency, especially during low-line, heavy-load conditions.

A controller of this disclosure can improve power factor at light load for a PFC circuit in QRM or CrCM operation. In either CrCM or QRM operation, the method of compensating the capacitive current through the EMI capacitors may work if there is an input voltage feedforward where the reference inductor current is available. The CrCM control can be derived from QRM control by fixing QR1 operation. Instead of constant on-time in normal CrCM control, the controller can operate with varying on-time within each AC half cycle.

The low power factor at light load may be caused by the current flowing through the EMI capacitors at the input of the PFC circuit. Hence, to improve power factor, the modified inductor current reference is set equal to the input current minus the capacitive current, instead of setting the inductor current reference equal to the input current, so that the inductor current reference reflects the true current flow in a PFC circuit. To approximate the capacitive current, the controller can use a digital differentiator to extract the capacitive current waveshape. To achieve good current shaping, the controller may set the average inductor current in a switching cycle equal to the modified inductor current reference to derive the desired on-time, as shown in Equation (9). By causing the effective on-time to track the desired on-time, the controller can determine an on-time to regulate the output voltage as well as to achieve good current shaping. The actual on-time varies within each AC half cycle because of QR operation and the varying switching frequency.

Figure 8:
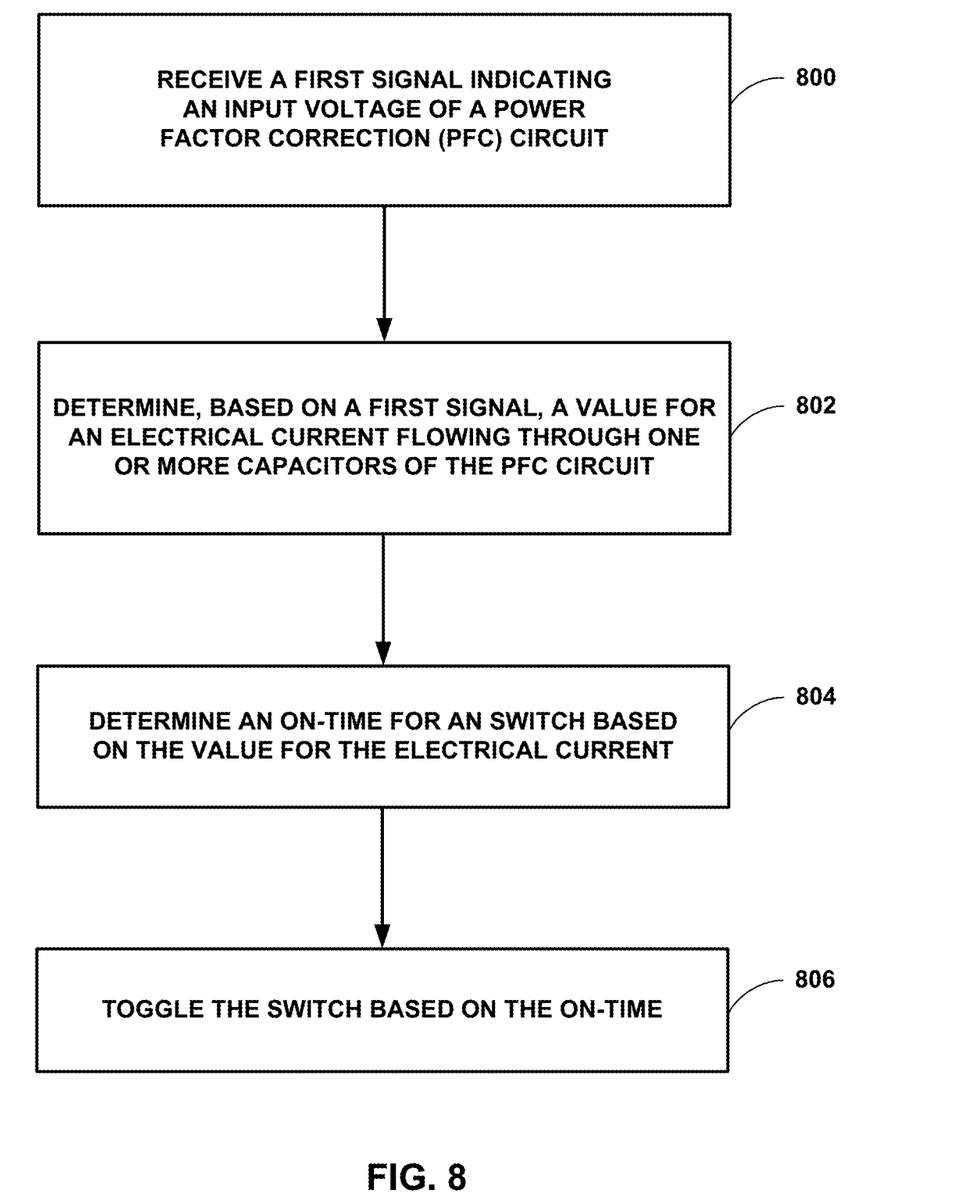
FIG. 8 is a flowchart illustrating an example process for controlling a PFC circuit, in accordance with one or more aspects of the present disclosure.

FIG. 8 is a flowchart illustrating an example process for controlling a PFC circuit, in accordance with one or more aspects of the present disclosure. The techniques of FIG. 8 are described with reference to controller 170 shown in FIG. 1, although other components, such as controller 570 shown in FIG. 5, may exemplify similar techniques.

In the example of FIG. 8, controller 170 receives, at node 172, a first signal indicating an input voltage of PFC circuit 140 (800). Controller 170 can receive the first signal from an output node of rectifier circuit 120. Controller 170 may receive the first signal through a divider circuit that scales down the voltage level of the input voltage from tens or hundreds of volts to two or three volts. The input voltage may be the voltage signal received by rectifier circuit 120, the voltage signal generated by rectifier circuit 120, and/or the voltage signal received by PFC circuit 140.

In the example of FIG. 8, processing circuitry 180 determines a value for an electrical current through one or more capacitors of PFC circuit 140 based on the first signal (802). The one or more capacitors may be arranged in filter circuits 310 and 330 and/or rectifier circuit 320, as shown in FIG. 3 (e.g., capacitors 360, 362, 364, and 366). Controller 170 can convert the first signal received at node 172 to a digital value using an ADC. Controller 170 can determine the electrical current by differentiating the first signal. For example, controller 170 can differentiate the digital value of the first signal and multiply the differentiated value by the total capacitance of the one or more capacitors to compute the electrical current.

In the example of FIG. 8, processing circuitry 180 determines an on-time for switch 142 based on the value for the electrical current (804). Processing circuitry 180 can determine a desired on-time for switch 142 based on the electrical current and further based on the DC component of the first signal received at node 172. Processing circuitry 180 can use an integrator (e.g., inner feedback controller 552) to determine an actual on-time for switch 142. Processing circuitry 180 may be configured to determine which local minimum to use as a trigger to turn on switch 142.

In the example of FIG. 8, processing circuitry 180 toggles switch 142 based on the on-time (806). Processing circuitry 180 can cause gate driver 190 to deliver an enabling signal to the control terminal of switch 142, where the enabling signal has a voltage that is sufficient to turn on switch 142. Processing circuitry 180 can use the determined on-time to calculate the local minimum during which to turn on switch 142.

The following numbered examples demonstrate one or more aspects of the disclosure.

Example 1

A controller controls a switch of a power factor correction circuit, where the controller includes a first node configured to receive a first signal indicating an input voltage of the power factor correction circuit. The controller also include processing circuitry configured to determine, based on the first signal, a value for an electrical current through one or more capacitors of the PFC circuit. The processing circuitry is further configured to determine an on-time for the switch based on the value for the electrical current and to toggle the switch based on the on-time.

Example 2

The controller of example 1, the on-time for the switch is a desired on-time for the switch, and the processing circuitry is further configured to determine an actual on-time based on the desired on-time using an inner control loop. The processing circuitry is also configured to toggle the switch based on the actual on-time.

Example 3

The controller of examples 1-2 or any combination thereof, the switch is a first switch, and the controller is configured to control operation of the first switch, control operation of a second switch of a power converter, where the power converter is coupled to the PFC circuit.

Example 4

The controller of examples 1-3 or any combination thereof, further including a second node configured to receive a second signal indicating a voltage drop across a load current path of the switch. The processing circuitry is further configured to detect one or more local minimum portions of the second signal. The processing circuitry is configured to determine the on-time at least in part by selecting, based on the first signal, a local minimum portion of the one or more detected local minimum portions.

Example 5

The controller of example 4, the processing circuitry is configured to toggle the switch at least in part by turning on the switch during the selected local minimum portion.

Example 6

The controller of examples 4 and 5 or any combination thereof, the processing circuitry is configured to detect the one or more local minimum portions at least in part by detecting one or more zero-crossings of the second signal.

Example 7

The controller of examples 1-6 or any combination thereof, the processing circuitry is configured to determine the value for the electrical current through the one or more capacitors at least in part by differentiating the first signal.

Example 8

The controller of example 7, the processing circuitry is configured to extract a waveshape of the electrical current through one or more capacitors based on the input voltage of the PFC circuit at least in part by differentiating the first signal.

Example 9

The controller of examples 7-8 or any combination thereof, the processing circuitry is configured to control the switch to cause an input current of the PFC circuit to closely match the input voltage.

Example 10

The controller of examples 1-9 or any combination thereof, the processing circuitry is configured to determine the on-time based on the value for the electrical current and further based on an output value of a PI control loop or an output value of a PID control loop.

Example 11

The controller of examples 1-10 or any combination thereof, the processing circuitry is configured to determine the on-time based on the value for the electrical current and further based on an inductance of an inductor of the PFC circuit.

Example 12

The controller of examples 1-11 or any combination thereof, the first node is configured to receive the first signal from an output node of a rectifier circuit coupled to the PFC circuit.

Example 13

The controller of examples 1-12 or any combination thereof, the processing circuitry is configured to determine the on-time for the switch within a control loop. The processing circuitry is further configured to compare, within the control loop, an output voltage of the PFC circuit to a target value within the control loop.

Example 14

The controller of examples 1-13 or any combination thereof, the processing circuitry is further configured to determine, within the control loop, an error value based on comparing the output voltage of the PFC circuit to the target value. The processing circuitry is also configured to determine, within the control loop, a control voltage based on integrating the error value.

Example 15

A method is for controlling a switch of a PFC circuit. The method includes receiving a first signal indicating an input voltage of the PFC circuit and determining, based on the first signal, a value for an electrical current through one or more capacitors of the PFC circuit. The method also includes determining an on-time for the switch based on the value for the electrical current and toggling the switch based on the on-time.

Example 16

The method of example 15, the on-time for the switch is a desired on-time for the switch, and the method further includes determining an actual on-time based on the desired on-time using an inner control loop. Toggling the switch is based on the actual on-time.

Example 17

The method of examples 15-16 or any combination thereof, further including receiving a second signal indicating a voltage drop across a load current path of the switch and detecting one or more local minimum portions of the second signal. Determining the on-time includes selecting, based on the first signal, a local minimum portion of the one or more detected local minimum portions.

Example 18

The method of examples 15-17 or any combination thereof, toggling the switch includes turning on the switch during the selected local minimum portions.

Example 19

The method of examples 15-18 or any combination thereof, determining the value for the electrical current through the one or more capacitors includes differentiating the first signal. The method further including extracting a waveshape of the electrical current through one or more capacitors based on the input voltage of the PFC circuit at least in part by differentiating the first signal.

Example 20

A device includes a computer-readable medium having executable instructions stored thereon, configured to be executable by processing circuitry for causing the processing circuitry to receive a first signal indicating an input voltage of a PFC circuit. The instructions further cause the processing circuitry to determine, based on the first signal, a value for an electrical current through one or more capacitors of the PFC circuit. The instructions also cause the processing circuitry to determine an on-time for a switch of the PFC circuit based on the value for the electrical current and toggle the switch based on the on-time.

Example 21

A device of example 20, the instructions further cause the processing circuitry to receive a second signal indicating a voltage drop across a load current path of the switch and detect one or more local minimum portions of the second signal. The instructions to determine the on-time include instructions to select, based on the first signal, a local minimum portion of the one or more detected local minimum portions.

This disclosure has attributed functionality to controllers 170 and 570 and processing circuitry 180. Controllers 170 and 570 and processing circuitry 180 may include one or more processors. Controllers 170 and 570 and processing circuitry 180 may include any combination of integrated circuitry, discrete logic circuitry, analog circuitry, such as one or more microprocessors, digital signal processors (DSPs), application specific integrated circuits (ASICs), and/or field-programmable gate arrays (FPGAs). In some examples, controllers 170 and 570 and processing circuitry 180 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be embodied or encoded in an article of manufacture including a non-transitory computer-readable storage medium, such as memory 192. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A controller for controlling a switch of a power factor correction (PFC) circuit, the controller comprising:
   a first node configured to receive a first signal indicating a rectified input voltage of the PFC circuit; and
   processing circuitry configured to:
      determine, based on the first signal, a value for an electrical current through one or more capacitors of the PFC circuit at least in part by differentiating the first signal;
      determine an on-time for the switch based on a ratio of the value for the electrical current to a digital representation of the first signal; and
      toggle the switch based on the on-time.

2. The controller of claim 1,
   wherein the on-time for the switch is a desired on-time for the switch,
   wherein the processing circuitry is further configured to determine an actual on-time based on the desired on-time using an inner control loop, and
   wherein the processing circuitry is configured to toggle the switch based on the actual on-time.

3. The controller of claim 1, further comprising a second node configured to receive a second signal indicating a voltage drop across a load current path of the switch,
   wherein the processing circuitry is further configured to detect one or more local minimum portions of the second signal, and
   wherein the processing circuitry is configured to determine the on-time at least in part by selecting, based on the first signal, a local minimum portion of the one or more detected local minimum portions.

4. The controller of claim 3, wherein the processing circuitry is configured to toggle the switch at least in part by turning on the switch during the selected local minimum portion.

5. The controller of claim 3, wherein the processing circuitry is configured to detect the one or more local minimum portions at least in part by detecting one or more zero-crossings of the second signal.

6. The controller of claim 1, wherein the processing circuitry is configured to extract a waveshape of the electrical current through the one or more capacitors based on the rectified input voltage of the PFC circuit at least in part by differentiating the first signal.

7. The controller of claim 1, wherein the processing circuitry is configured to control the switch to cause an input current of the PFC circuit to closely match the rectified input voltage.

8. The controller of claim 1, wherein the processing circuitry is configured to determine the on-time based on the value for the electrical current and further based on an output value of a proportional-integral (PI) control loop or an output value of a proportional-integral-derivative (PID) control loop.

9. The controller of claim 1, wherein the processing circuitry is configured to determine the on-time based on the value for the electrical current and further based on an inductance of an inductor of the PFC circuit.

10. The controller of claim 1, wherein the first node is configured to receive the first signal from an output node of a rectifier circuit coupled to the PFC circuit.

11. The controller of claim 1,
wherein the processing circuitry is configured to determine the on-time for the switch within a control loop, and
wherein the processing circuitry is further configured to compare, within the control loop, an output voltage of the PFC circuit to a target value within the control loop.

12. The controller of claim 11, wherein the processing circuitry is further configured to:
determine, within the control loop, an error value based on comparing the output voltage of the PFC circuit to the target value; and
determine, within the control loop, a control voltage based on integrating the error value.

13. A method for controlling a switch of a power factor correction (PFC) circuit, the method comprising:
receiving a first signal indicating a rectified input voltage of the PFC circuit;
determining, based on the first signal, a value for an electrical current through one or more capacitors of the PFC circuit at least in part by differentiating the first signal;
determining an on-time for the switch based on a ratio of the value for the electrical current to a digital representation of the first signal; and
toggling the switch based on the on-time.

14. The method of claim 13,
wherein the on-time for the switch is a desired on-time for the switch,
wherein the method further comprises determining an actual on-time based on the desired on-time using an inner control loop, and
wherein toggling the switch is based on the actual on-time.

15. The method of claim 13, further comprising:
receiving a second signal indicating a voltage drop across a load current path of the switch; and
detecting one or more local minimum portions of the second signal,
wherein determining the on-time comprises selecting, based on the first signal, a local minimum portion of the one or more detected local minimum portions.

16. The method of claim 15, wherein toggling the switch comprises turning on the switch during the selected local minimum portions.

17. The method of claim 13, further comprising extracting a waveshape of the electrical current through the one or more capacitors based on the rectified input voltage of the PFC circuit at least in part by differentiating the first signal.

18. A device comprising a computer-readable medium having executable instructions stored thereon, configured to be executable by processing circuitry for causing the processing circuitry to:
receive a first signal indicating a rectified input voltage of a power factor correction (PFC) circuit;
determine, based on the first signal, a value for an electrical current through one or more capacitors of the PFC circuit at least in part by differentiating the first signal;
determine an on-time for a switch of the PFC circuit based on a ratio of the value for the electrical current to a digital representation of the first signal; and
toggle the switch based on the on-time.

19. The device of claim 18, wherein the instructions further cause the processing circuitry to:
receive a second signal indicating a voltage drop across a load current path of the switch; and
detect one or more local minimum portions of the second signal,
wherein the instructions to determine the on-time comprise instructions to select, based on the first signal, a local minimum portion of the one or more detected local minimum portions.

20. The device of claim 18, wherein the instructions further cause the processing circuitry to extract a waveshape of the electrical current through the one or more capacitors based on the rectified input voltage of the PFC circuit at least in part by differentiating the first signal.

* * * * *